Sept. 21, 1926.
B. W. P. COGHLIN
1,600,933
AUTOMOBILE BUMPER END
Filed Dec. 26, 1925
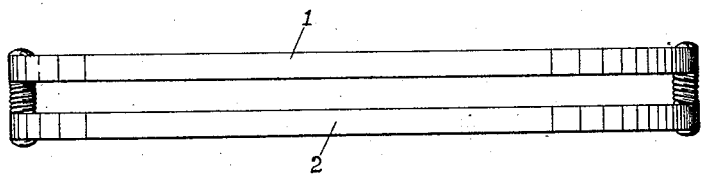
Fig. I.
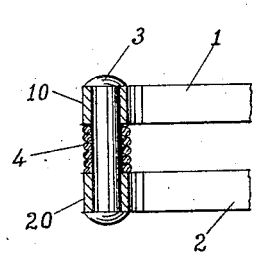
Fig. II.
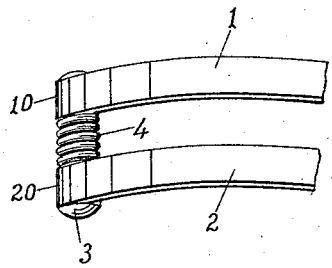
Fig. III.
INVENTOR.
BERNARD W. P. COGHLIN.
By
ATTORNEY.

Patented Sept. 21, 1926.

1,600,933

UNITED STATES PATENT OFFICE.

BERNARD W. P. COGHLIN, OF MONTREAL, QUEBEC, CANADA.

AUTOMOBILE BUMPER END.

Application filed December 26, 1925. Serial No. 77,841.

This invention relates to bumpers for automobiles and has for its object to provide an improved form of end connections.

A further object is to provide a bumper with a plurality of bars with an end fastening which will avoid rattling and looseness, which is readily applied and is durable in use.

Hitherto the bars of bumpers have been secured at their ends with bolts and washers or sleeves, separating the bars and forming a rigid fitting. Under the constant vibration to which these bumpers are subjected the ends have a tendency to become loose and as a result cause a rattle which is objectionable.

The invention consists in replacing the washers or sleeves on the bolts by a coil spring under compression.

Reference is made to the accompanying drawings in which—

Fig. I shows a two barred bumper mounted with the device.

Fig. II shows a vertical section of the end fastening.

Fig. III shows an enlarged view of one end of a bumper fitted with the device.

The device consists of a coil spring 4 surrounding the bolt 3, to which the ends 10, 20, of the bumper bars 1, 2, are secured, between the bars.

The end of the bolt 3, may be headed as shown in Fig. III or secured by a nut, preferably a lock-nut.

By means of this coil spring between the ends of the bars secured under compression by the bolt, the end of the bumper is provided with a secure fastening which will not become loose or rattle under any circumstances.

What I claim is:—

1. In a double barred bumper, a coil spring inserted between the ends of the bars and surrounding the connecting bolt.

2. In a bumper with a plurality of bars, the combination of a bolt securng the ends of the bars in alignment, with coil springs between the ends of the bars, and surrounding the bolt.

3. In a bumper, the combination of the ends of the bars secured in alignment by a bolt, with a coil spring under compression between the ends of the bars, and surrounding the bolt.

Montreal, December 1, 1925.

BERNARD W. P. COGHLIN.